M. A. BROWN.
ATTACHMENT FOR AIR BRAKE COUPLINGS.
APPLICATION FILED MAR. 21, 1911.
1,012,514.
Patented Dec. 19, 1911.
2 SHEETS—SHEET 1.
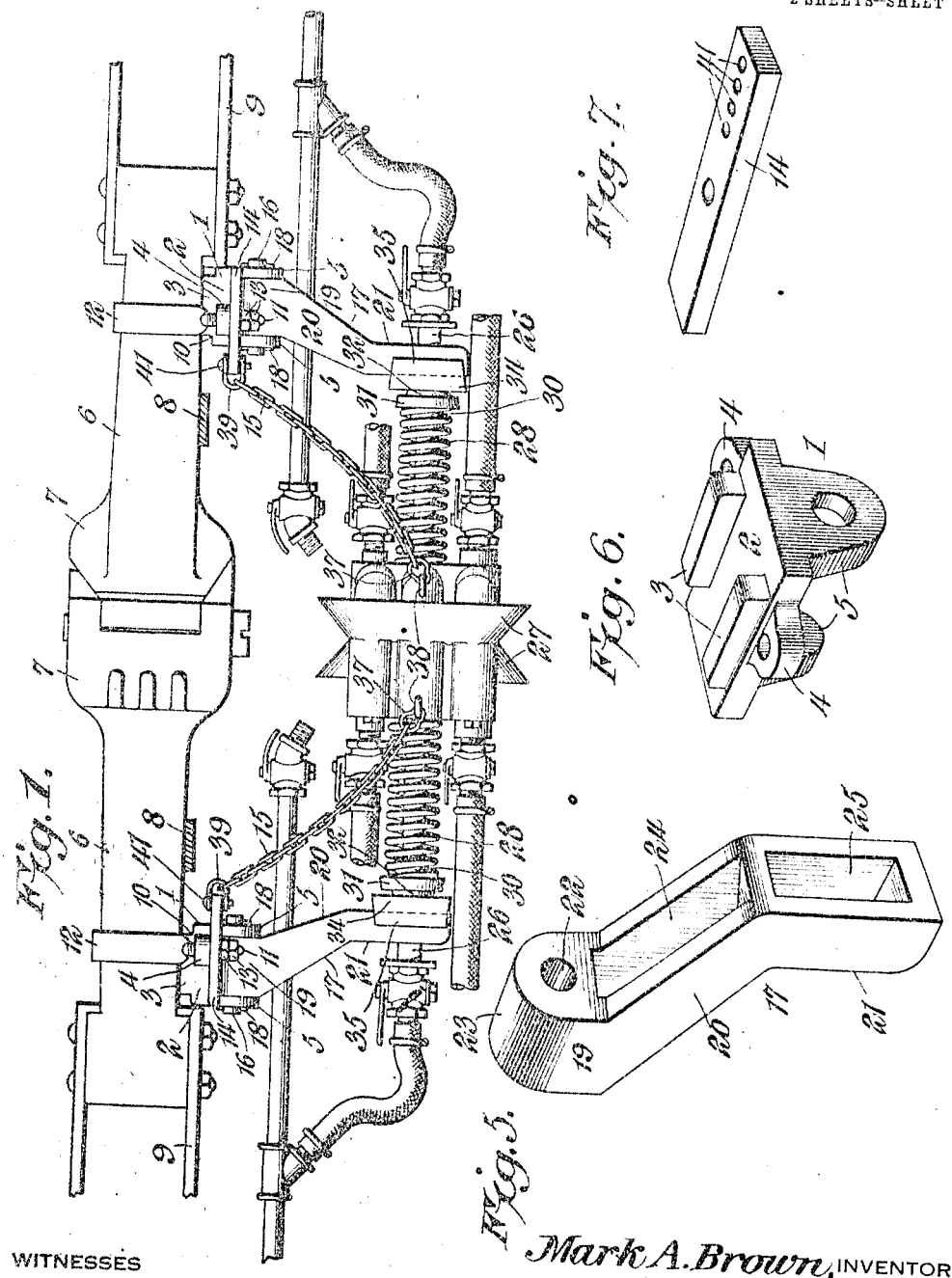
WITNESSES
Howard D. Orr.
H. P. Riley
Mark A. Brown, INVENTOR,
BY E. G. Siggers
ATTORNEY M. A. BROWN.
ATTACHMENT FOR AIR BRAKE COUPLINGS.
APPLICATION FILED MAR. 21, 1911.
1,012,514.
Patented Dec. 19, 1911.
2 SHEETS—SHEET 2.
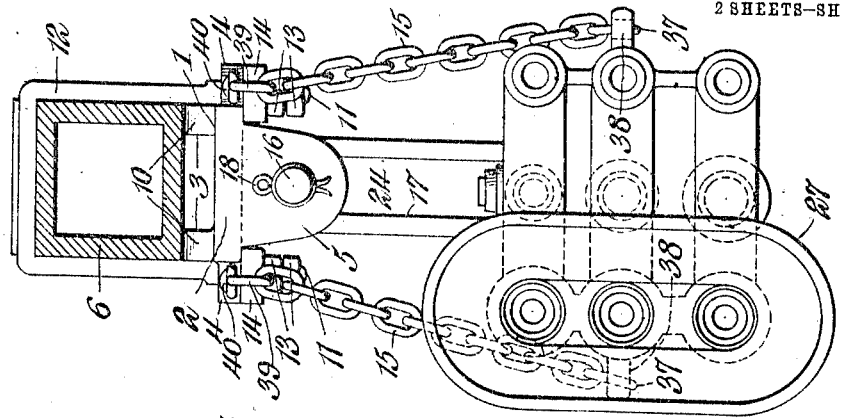
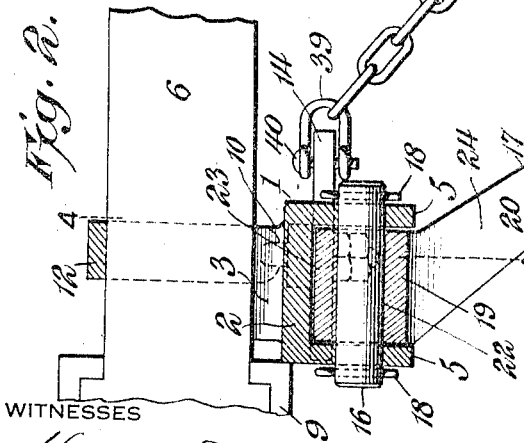
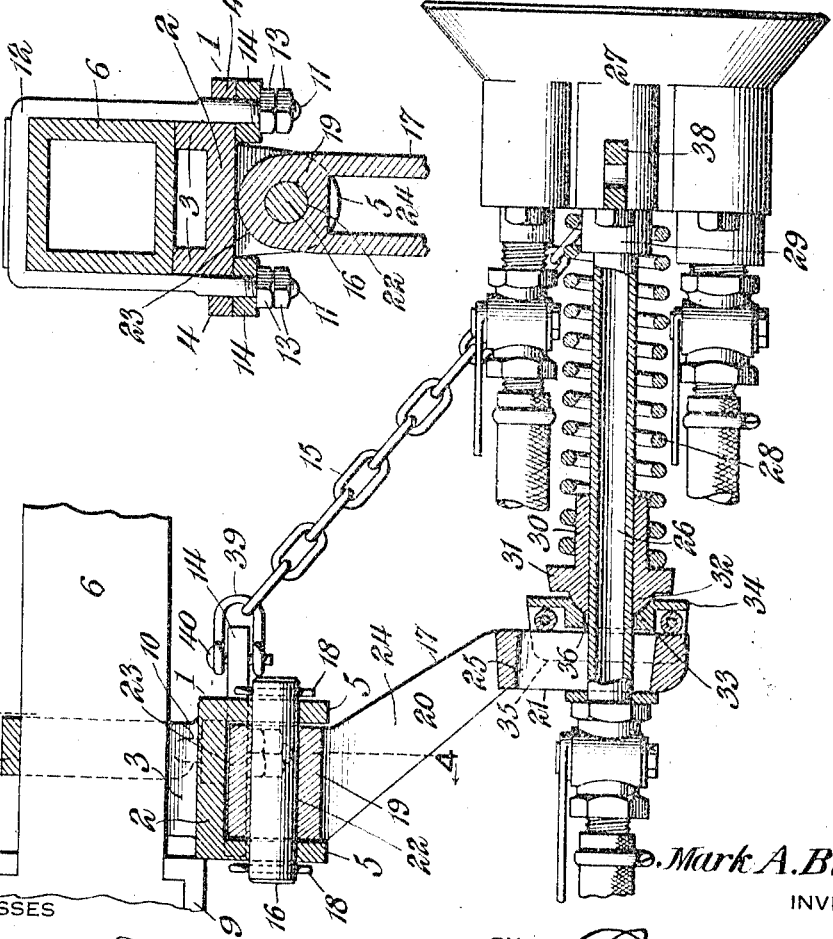
WITNESSES
Mark A. Brown,
INVENTOR,
BY
ATTORNEY

UNITED STATES PATENT OFFICE.

MARK A. BROWN, OF CHATTANOOGA, TENNESSEE, ASSIGNOR TO BROWN AUTOMATIC CONNECTOR COMPANY, OF CHATTANOOGA, TENNESSEE.

ATTACHMENT FOR AIR-BRAKE COUPLINGS.

1,012,514.  Specification of Letters Patent.  Patented Dec. 19, 1911.

Application filed March 21, 1911. Serial No. 615,907.

*To all whom it may concern:*

Be it known that I, MARK A. BROWN, a citizen of the United States, residing at Chattanooga, in the county of Hamilton and State of Tennessee, have invented a new and useful Attachment for Air-Brake Couplings, of which the following is a specification.

The invention relates to an attachment for air brake couplings.

The object of the present invention is to improve the construction of air brake couplings, more especially the means for suspending the same beneath a car, and to provide a simple, efficient and inexpensive device, adapted to be readily applied to the shank of any standard M. C. B. car coupler without necessitating any alteration in the construction of the same, and capable of affording free longitudinal, vertical and lateral movement of the air brake coupling, whereby the latter is adapted to automatically accommodate itself to the vertical movement and lateral vibrations of a car in motion without straining or impairing the union of two connected air brake couplings.

A further object of the invention is to provide a device of this character, adapted to be quickly secured to and removed from a car coupler, and capable of being readily arranged in the space between the draft yoke or other attaching means and the adjacent carry iron without interfering with the longitudinal movement of the car coupler.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation, showing two air brake couplings connected together and equipped with supporting devices, constructed in accordance with this invention. Fig. 2 is a longitudinal sectional view of one of the air brake couplings. Fig. 3 is a front elevation of the same, the shank of the car coupling being in section. Fig. 4 is a transverse sectional view on the line 4—4 of Fig. 2. Fig. 5 is a detail perspective view of the suspension bracket. Fig. 6 is a detail perspective view of the bearing bracket or support. Fig. 7 is a detail perspective view of one of the chain adjusting plates.

Like numerals of reference designate corresponding parts in all the figures of the drawings.

In the accompanying drawings in which is illustrated the preferred embodiment of the invention, 1 designates a bearing bracket or support, constructed of suitable metal and consisting of a flat horizontal plate 2, provided at its upper face with parallel longitudinal ribs or flanges 3 and having laterally extending ears 4, and provided also at the front and back with depending longitudinally alined bearing lugs 5. The ribs or flanges 3 are adapted to fit against the lower face of the shank 6 of a car coupler 7, and to space the plate or body portion 2 of the bracket from the shank to permit the bearing bracket or support to clear the carry iron 8, in order to enable the bearing bracket to be applied to car couplers where there is a comparatively small amount of space between the carry iron 8 and the draft yoke 9 or other draft mechanism. The ribs or flanges 3 have a vertical thickness or height in excess of the carry iron 8, so that if necessary the carry iron may in the longitudinal movement of the car coupler extend into the recess or space 10 between the front or outer end of the plate 2 and the lower face of the shank 6. This construction will be found of especial advantage in those car couplings where a relatively wide carry iron is employed. The laterally extending ears or lugs 4 are provided with perforations for lower threaded portions 11 of the sides of a U bolt 12, which has flat upper side portions and a flat top connecting portion, as clearly illustrated in Figs. 1 and 2 of the drawings. This construction enables the bearing bracket or support to be secured to the shank 6 of the car coupler by a single fastening means without liability of twisting or turning. Any equivalent construction may be employed for securing the bearing bracket or support to the shank 6 of the car coupler, but the U bolt has the advantage of simplicity and it does not necessitate drilling holes through the shank 6, or otherwise altering the construction thereof. The lower threaded portions 11 receive nuts 13, preferably arranged in pairs as shown to obtain a locking action, and they also secure a pair of flat oblong plates 14 to the bearing bracket or support. The plates 14 are fitted against the lower face of the plate 2 of the bearing bracket or support at opposite sides of the depending bearing lugs 5, and they are provided with openings through which the sides of the U bolt pass. The side plates operate in the nature of washers and also serve as means for adjustably connecting chains 15 to the bearing bracket or support.

The depending bearing lugs 5 of the bracket or support 1 receive a horizontal pin 16, which pivots a depending suspension bracket 17 to the bearing bracket or support. The pivot pin 16 is preferably retained in the bearing openings of the lugs 5 by keys 18, but any other suitable fastening means may be employed for this purpose. The depending bearing bracket consists of a short upper vertical portion 19, a downwardly and forwardly inclined intermediate portion 20, and a lower vertical outer or front portion 21, arranged in advance of the plane of the rear face of the vertical top portion. The vertical top portion is provided with a central horizontal bearing opening 22 for the passage of the pivot pin 16, and its top 23 is rounded transversely to permit a free swinging movement of the suspension bracket, which is fitted between the bearing lugs in close proximity to the lower face of the plate 2 of the bearing bracket or support. This provides a strong construction not liable to be broken by the jars and vibrations incident to coupling and uncoupling cars and to the movement of the parts thereof when the train is in motion. The intermediate inclined portion 20 is provided with a longitudinal opening 24 to lighten the construction, and the lower vertical portion 21 is also provided with an opening 25, arranged vertically and receiving the shank or stem 26 of a coupling head 27 of the air brake coupling, shown and described in my co-pending application, filed Apr. 6, 1910, Serial No. 553,736.

The suspension bracket supports the rear portion of the car brake coupling, and the coupling head 27 is yieldably maintained in proper position for coupling by a coiled spring 28, surrounding the pipe or stem 26 and having its outer or forward end fitted on the tubular extension or nipple 29 of the coupling head. The rear or inner end of the coiled spring 28 is arranged on a sleeve 30, having an enlarged portion or flange 31 at its rear end and provided at the same with a tubular rounded projection 32, which fits in a socket 33 of a slidable plate or member 34. The slidable plate or member 34 is fitted against the front or outer edges of the lower vertical portion 21 of the suspension bracket, and it is provided with side flanges 35 to embrace the lower vertical portion of the bracket. The pipe or stem 26 extends through a central opening 36 of the slidable plate or member 34. The central opening 36 is of sufficient diameter to permit a free movement of the air brake coupling in any direction on the bore and socket joint or bearing, formed by the rounded tubular projection and the socket 33 of the slidable plate or member 34. This will enable the coupling head to yield to the vertical movement and lateral vibration of the cars when in motion, and in practice the connected air brake couplings will maintain a relatively central position, while the swinging of the suspension bracket accommodates the parts to the lateral swaying or vibratory movements of the cars. Also this construction will enable the operation of the automatic coupling to be effected on curves as well as on a straight track. The construction of the air brake coupling and the air and steam connections is substantially the same as those shown, described and claimed in the aforesaid application, and further description thereof is deemed unnecessary.

The air brake coupling when uncoupled is supported in a horizontal position by the chains 15 or equivalent flexible connections, which are slackened when the air brake coupling is coupled with an expansion coupling. When the air brake coupling is coupled, the chains do not perform any function, and are sufficiently slack to permit a free movement of the air brake couplings in any direction without liability of straining or impairing the air tight union or joint between the couplings. The chains 15, which extend downwardly and outwardly from the bearing bracket or support, are provided at their lower ends with enlarged lap links 37, which are linked into perforations of the lugs 38, extending laterally from opposite sides of the coupling head 27 and arranged centrally thereof with respect to the top and bottom of the coupling head. The upper ends of the chains are connected by clevises 39 with the front portions of the plates 14. The clevises are approximately U-shaped to embrace the front portions of the plates 14, and they are provided with perforations for the reception of pins 40 or other suitable fastening devices. The front ends of the plates 14 project beyond the front or outer end of the bearing bracket or support, and are provided at intervals with perforations 41, adapted to receive the pin 40 to permit an adjustment of the chains to lengthen and shorten the same. The chains are adapted to extend either from the front or side of the projecting front portions of the plates 14 and they diverge outwardly, as clearly shown in Fig. 3 of the drawings. The expansion of the spring 28, when the air brake coupling is uncoupled, automatically stretches the chains in a taut condition so that the outwardly diverging chains will firmly support the coupling head in a central horizontal position for coupling, whereby the air brake couplings will couple automatically when the cars are coupled without requiring any attention on the part of the trainmen.

Having thus fully described my invention, what I claim as new and desire to secure by Letters Patent, is:—

1. A device of the class described comprising a bearing bracket or support, means for securing the same beneath a car, a suspension bracket depending from the bearing bracket or support and provided with means for supporting the inner or rear portion of an air brake coupling, a longitudinally disposed horizontal pivot connecting the suspension bracket to the bearing bracket or support and permitting a lateral swinging movement of the former, and flexible connections supporting the outer portion of the air brake coupling and coöperating with the suspension bracket to support the air brake coupling in position for coupling.

2. The combination with an air brake coupling having a cushioning spring, a bearing bracket or support provided with means for securing it to the shank of a car coupler, a suspension bracket pivotally connected to and depending from the bearing bracket or support and provided with means for supporting the inner or rear portion of the air brake coupling, and flexible connections extending downwardly and outwardly from the bearing bracket or support and connected with the front or outer portion of the air brake coupling for supporting the same in position for coupling, said flexible connections being maintained taut by the cushioning spring and being automatically slackened through the compression of the spring when the air brake coupling is coupled.

3. A device of the class described including a bearing bracket or support adapted to fit the underside of the shank of a car coupler, a U bolt adapted to embrace the shank of the car coupler and provided with means for engaging the bearing bracket or support, an extension bracket pivotally connected with and depending from the bearing bracket or support and provided with means for supporting the inner or rear portion of an air brake coupling, and flexible connections extending downwardly and outwardly from the bearing bracket or support and provided at their lower ends with means for connecting them with the front or outer portion of the air brake coupling.

4. A device of the class described including a bearing bracket or support consisting of a plate provided at its upper face with ribs or flanges arranged to space the plate from the underside of the shank of a car coupler, a suspension bracket pivotally connected with the plate and depending therefrom and having means for supporting the inner or rear portion of an air brake coupling, and flexible connections extending from the front portion of the bearing bracket or support and spaced from the shank of the car coupler and extending downwardly and outwardly and provided at their lower ends with means for connecting them with the outer or front portion of the air brake coupling.

5. A device of the class described including a bearing bracket or support consisting of a plate provided at its upper face with ribs or flanges spaced from the front end of the plate and adapted to fit against the underside of a shank of a car coupler, said plate being also provided with depending longitudinally alined bearings, a pivot arranged in the said bearings, a suspension bracket having its upper end fitted between the bearings and provided with an opening to receive the said pivot, said suspension bracket being also provided at its lower end with means for supporting the inner or rear portion of an air brake coupling, and flexible connections extending downwardly and outwardly from the bearing bracket or support and provided with means for connecting them with the outer or front portion of the air brake coupling.

6. A device of the class described including a bearing bracket or support provided at opposite sides with openings, a U bolt adapted to embrace the shank of a car coupler for securing the bearing bracket or support beneath the same, a suspension bracket pivotally connected to and depending from the bearing bracket or support and provided with means for supporting the inner or rear portion of an air brake coupling, longitudinal side plates fitted against the bearing bracket or support and secured to the same by the said U bolt and having projecting front portions provided with perforations, and inclined outwardly diverging chains provided at their lower ends with means for connecting them with the air brake coupling at opposite sides thereof and having clevises at their upper ends, said clevises having pins for adjustably engaging the perforations of the extended portions of the side plates.

In testimony, that I claim the foregoing as my own, I have hereto affixed my signature in the presence of two witnesses.

MARK A. BROWN.

Witnesses:
JOHN H. SIGGERS,
EDITH L. BROWN.